United States Patent [19]
Pryor

[11] 3,883,249
[45] May 13, 1975

[54] Z-FACTOR AND OTHER DIFFRACTOGRAPHIC DISPLACEMENT AND PROFILE SENSORS

[76] Inventor: Timothy R. Pryor, P.O. Box 2093, Windsor, Ontario, Canada, N8Y 4R5

[22] Filed: May 9, 1973

[21] Appl. No.: 358,547

Related U.S. Application Data

[63] Continuation-in-part of Ser. Nos. 253,421, May 15, 1972, and Ser. No. 256,099, May 23, 1972, Pat. No. 3,797,939, and Ser. No. 329,121, Feb. 2, 1973.

[52] U.S. Cl. .............................. 356/109; 356/111
[51] Int. Cl. ............................................. G02b 9/02
[58] Field of Search .......... 356/106, 107, 108, 109, 356/110, 111, 112, 113; 350/162 R; 250/574

[56] References Cited
UNITED STATES PATENTS
| | | | |
|---|---|---|---|
| 3,518,007 | 6/1970 | Ito | 356/109 |
| 3,709,610 | 1/1973 | Kruegle | 356/111 |

*Primary Examiner*—Ronald L. Wibert
*Assistant Examiner*—Conrad Clark
*Attorney, Agent, or Firm*—Larson, Taylor & Hinds

[57] ABSTRACT

Disclosed are a method and devices for determining the relative position of two boundaries by analyzing the interference pattern produced by diffraction waves created when a laser beam irradiates the boundaries.

39 Claims, 9 Drawing Figures

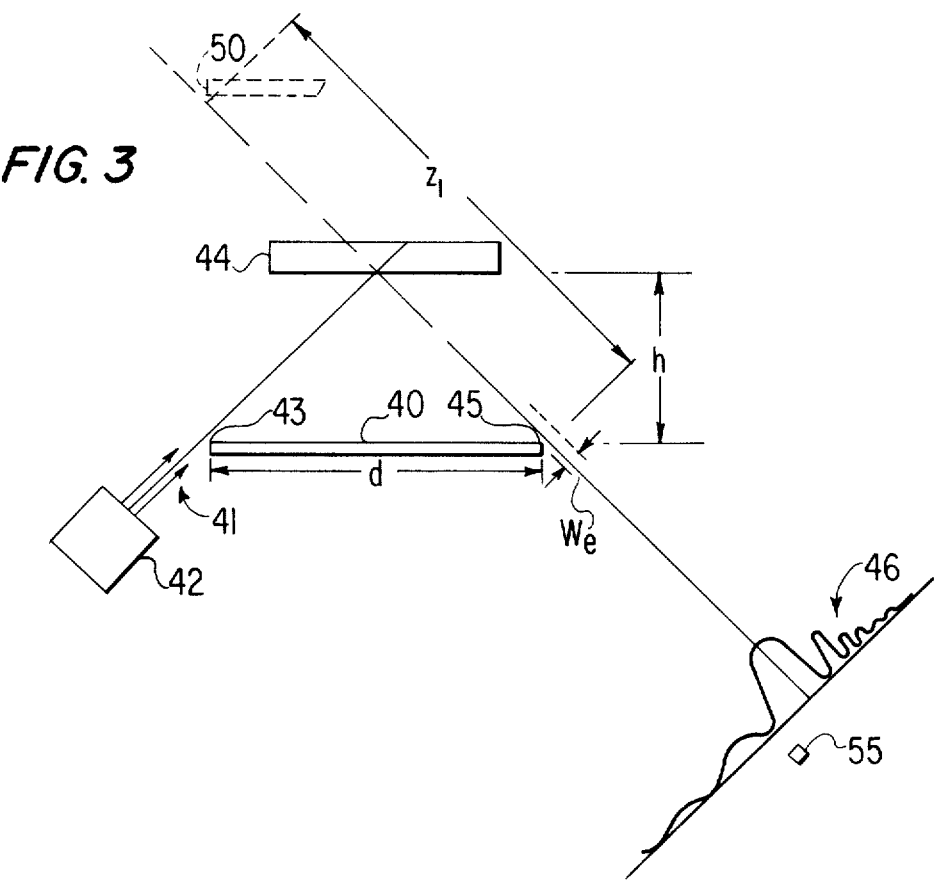
FIG. 3
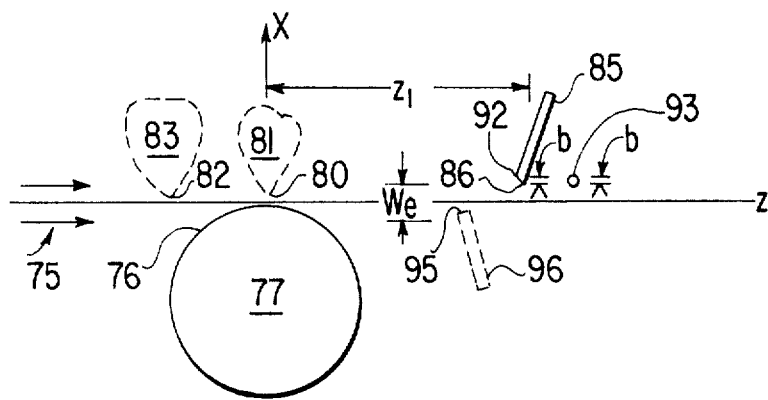
FIG. 4
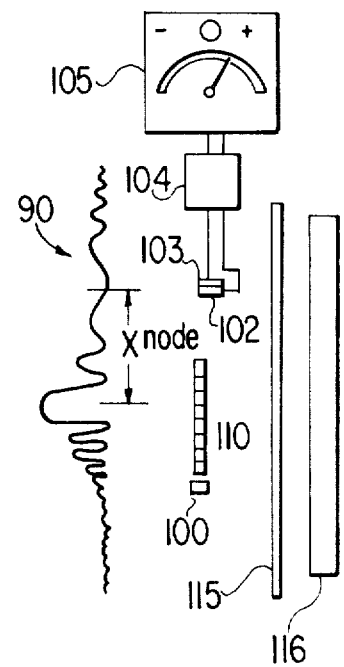

Z-FACTOR AND OTHER DIFFRACTOGRAPHIC DISPLACEMENT AND PROFILE SENSORS

INTRODUCTION

This application is a continuation-in-part of my U.S. applications Ser. Nos. 253,421, filed May 15, 1972 and 256,099, filed May 23, 1972 now U.S. Pat. No. 3,797,939, and 329,121, filed Feb. 2, 1973, herein incorporated by reference, and is partially described in my U.S. Patent Office disclosure document No. 005790 dated June 23, 1971 entitled "Z-Factor Diffractographic Devices".

The above referenced applications relate generally to the invention described in my earlier U.S. application Ser. No. 751,615 filed Aug. 4, 1968, now U.S. Pat. No. 3,664,739, issued May 23, 1972, describing measurement of changes in the separation of adjacent members through analysis of Franuhofer type diffraction patterns produced when the slit aperture formed by opposing edges of the members is irradiated with electromagnetic waves. The name "Diffractographic" is used to describe this method and it has been the subject of several scientific papers published or in press at this time.

BACKGROUND

A wide variety of scientific, commercial, and industrial measurement applications call for high accuracy dimensional sensing. Usable techniques are rare, particularly those which do not require contact with the object to be gaged.

My earlier "Diffractographic" invention is just such a high accuracy non-contacting dimensional gaging technique and my earlier patent describes several embodiments usable for general dimensional measurement. Further embodiments disclose diffractographic techniques for obtaining relative dimensions and profiles of objects, for example those traveling on conveyor belts, or those drawn from dies or extrusion presses.

A particular need exists in those industries manufacturing thin sheet material or applying coatings thereon to determine, one-line, the thickness of either sheet or coating during the manufacturing process. In addition, it is usually required to determine thickness at a multiplicity of positions across the sheet. Due to the sheet velocity, a non-contacting sensing system is virtually required.

The need for such a thickness sensor is great, since in many cases the cost of the material used to make or coat the sheet is quite high, ranging from $1.00 per kg. for the cheaper plastics to over $15.00 per kg. for silicones, some metals, and photographic emulsions.

At present, no generally satisfactory system exists for precisely and reliably gaging the thin sheets and coatings involved (typically, under 0.1 mm and 0.01 mm, respectively).

Availability of such an accurate on-line gaging system would allow in-process corrections and optimization of the thickness, and it is reasonable to predict saving of at least 10 percent in material cost, together with improved product quality. The dollar volume of such a saving is very large indeed.

Accordingly, it is an object of this invention to disclose such sheet thickness gaging systems as well as diffractographic apparatus for general purpose use in science and industry.

FIG. 3 is a side elevation of another "z-factor" embodiment of the invention.

FIG. 4 is a side elevation of a further "z-factor" embodiment of the invention.

DETAILED DESCRIPTION

The diffraction pattern of a slit has a well known intensity distribution, symmetric about the incident wave axis and composed of fringes whose intensity decreases with distance from the pattern centerline and whose position is a function of the slit width.

In practicing the invention, I have found that the term "diffraction pattern" is somewhat of a misnomer, since it is essentially interference of coherently related waves, one from each edge boundary of the slit, which produces the fringes used.

My realization that the Diffractographic invention can be described in terms of an interference pattern produced by coherent interaction of waves diffracted by each boundary has indicated to me that other arrangements of two boundaries, or indeed arrangements utilizing more than two boundaries, could be devised to produce diffraction waves which would interact to form interference patterns whose fringes would move in such a manner as to allow the relative position of members to be determined.

Figure 1:
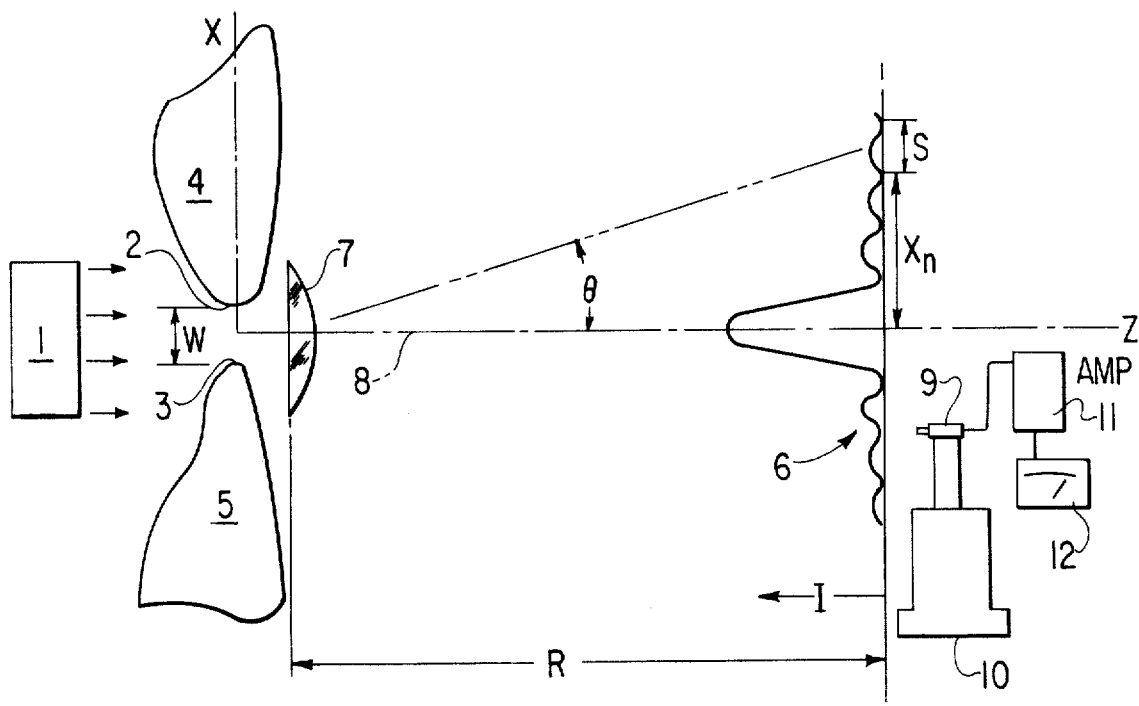
FIG. 1 is a side elevation of an embodiment illustrating the basic diffractographic sensing method.

A typical diffractographic example is shown in FIG. 1. Here a gas laser 1, emits a uniphase monochromatic plane wave of wave length $\lambda$ which is incident on, and diffracted by, diffraction wave producing edges 2 and 3 of adjacent objects 4 and 5 forming a slit aperture of width, w. Since the objects are separate members, displacement of one relative to the other may freely occur, causing changes in the intensity distribution of "Fraunhofer" type interference pattern 6 formed in the focal plane of convex lens 7, of focal length R. The interference pattern 6 is formed about axis 8 extending in the direction of the propagation of the electromagnetic radiation from source 1. In this embodiment, axis 8 is in alignment with electromagnetic radiation incident upon edges 2 and 3, and furthermore, the interference pattern is symmetrical about axis 8. Lens 7 is optional. Where the lens 7 is utilized, the angle $\theta$ and the distance R are measured from the axis of symmetry of the lens. Where lens 7 is not utilized, and in this event R must be much greater than w, $\theta$ and R are measured from the gap between edges 2 and 3. When the lens is used, it is placed in close proximity to edges 2 and 3. Measurement of changes in the pattern provides values related to displacement as described below:

Virtually all intermediate optics texts give the intensity distribution of such a pattern, which is $$I = I_o/R^2 \sin^2\beta/\beta^2 \quad (1)$$

where $I_o$ is the intensity at the pattern center, and $$\beta = \pi/\lambda \, w \sin \theta \quad (2)$$

The pattern has therefore a decaying sine squared distribution with zeros of intensity or "minima" everywhere $$w \sin \theta = n \lambda \quad (3)$$

where $n$ is a non-zero integer.

In the region of small angles $\theta$ where $\sin \theta = \theta$, equation (3) can be written $$x = nR\lambda/w \quad (4)$$

In this small angle region, the fringes are linearly spaced with spacing $$s = R\lambda/w \quad (5)$$

and we can define for them a spatial fringe frequency (eg. fringes/mm $$f = w/R\lambda \quad (6)$$

Now suppose a force is applied to member 4 of FIG. 1 causing it to be further displaced from member 5 by an amount $\delta_x$. This will cause w to increase by the amount of the displacement, producing changes in the frequency of the pattern fringes which are linearly related in the small angle region to changes in separation by the equation:

$$\delta_x = (w'-w) = R\lambda \, (f'-f) \quad (7)$$

Two other relations can also be used, written here for the case of small angles $\theta$, $$\delta_x = nR \lambda \, (1/x' - 1/x) \quad (8)$$

and $$\delta_x = R \lambda \, (1/s' - 1/s) \quad (9)$$

Before continuing, it is useful to consider the following equation and its variations $$N_{\theta_d} = \delta_x \sin \theta_d/\lambda \quad (10)$$

This equation is derivable from equs. 2, 3 and 7 and predicts the number of fringes (integer or fractional) passing a particular angular location $\theta_d$ for a given displacement $\delta_x$. $N_{\theta_d}$ is therefore a measure of the fringe count sensitivity to displacement, and is a useful criteria in ascertaining performance of count type detection systems Several outstanding characteristics relevant to practical applications are apparent from the equations. First, is their evident simplicity. Change in separation is determined from a measured quantity $s, f, x$, or $N_{\theta_d}$ and two essentially constant quantities, $\lambda$ and R, or $\lambda$ and $\theta$. Thus a very high, long term accuracy is implied together with a freedom from non-linearities, drift and other electrical fluctuations as experienced in other displacement sensing systems. The key point is that wavelength is providing the measurement base, and with laser sources this is a quantity known with great precision.

I have found in practice that, using low powered and inexpensive He-Ne laser sources, changes in separation of 0.1 to 0.5 microns are generally measurable by the invention over displacement ranges of several millimeters using the unaided eye and ordinary linear measuring instruments. Using simple photodetection means, better than 0.01 micron has been achieved. From theoretical considerations, considerably better performance is possible but thermal gradients in the surrounding air usually cause unwanted movements of the interference pattern fringes which limit sensitivity to the values above. Such thermal errors can be minimized by observing movements of higher rather than lower fringe orders, however.

The range of separation measurement is limited by the minimum distance $w_{min}$ and the fringe resolution ability of the detection system used. At light wavelengths, a typical maximum measurable change in separation is 3 millimeters although displacements several times this have been measured.

The convex lens shown in FIG. 1 may be either cylindrical or spherical, the latter focussing the pattern (ordinarily of laser beam width in the y direction) to a fine line. Not only does a lens form a pattern no matter what value of w is used, but the pattern formed does not move in space as the centerline between the two edges moves. This is a particularly important feature in those systems where, for example, a detector and one edge is fixed in space with the other moving toward or away from it.

The lens may equivalently be located between source and edges, and diverging, as well as plane, waves may be incident on the lens, (which may itself be a system of lenses). When the lens is between source and edges, the distance R in the above equations becomes the distance from the slit to the focus.

If plane, or nearly plane, waves are incident on the edges, no lens is required to form a Fraunhofer interference pattern, as long as the distance R from wave producing means to the observation plane is much greater than w. This situation is almost always used in laboratory experiments.

While Fraunhofer type diffraction is definitely preferred because of the simple equations relating measurable pattern quantities to slit width, the technique is not limited to this case. In particular, it is noted that nearly Fraunhofer conditions will produce quite usable patterns of a similar nature. While the minima are not zeros of intensity in this case, their change in position effectively indicates displacement using the equations above (within a negligibly small error in most cases).

It should be further noted that by utilizing two linear, parallel edges to form diffraction waves, the maximum amount of incident light is diffracted in a single direction, thereby maximizing intensity changes in the interference pattern resulting from changes in separation between the members whose edges form the aperture.

While the system may use any suitable electromagnetic wave source, there are some definite preferences therein. First it is preferred in general that light or near infra-red sources be used, due to the availability of suitable detection means. In addition, the short wave length source may result in higher displacement sensitivity (though less range) in some apparatus configurations.

Second, it is generally preferred that the wave source be monochromatic and of constant known phase relation at each diffraction wave producing means. In practice, the degree in which this condition is met determines the number of fringes which can be reliably observed — a factor related to both range and sensitivity of displacement measurement. Generally speaking, laser sources and particularly gas lasers, give excellent performance in both respects, with narrow strip light emitting diodes (LED's) having sufficient monochromaticty and spatial coherence for some applications.

Suitable diffraction waves can be produced by the edges or other boundaries of objects composed of virtually any material, and whose size may range from the largest of members to the thinnest of foils. To date, displacements of everything from large concrete structural members to tissue paper strips have been measured using the invention and this almost universal applicability has been responsible for much of the technique's success.

Opaque solids are not the only materials which can create boundary diffraction waves, however. For example, displacements of a mercury meniscus in a glass tube can be measured using the invention. In addition a phase discontinuity in a transparent liquid or solid may also produce a suitable diffraction wave.

The shape of the diffraction boundary may in some cases influence the intensity distribution of the diffraction wave, though not in general the fringe locations produced due to its interaction with other waves. A wide variety of boundary shapes have been used, from razor blade edges to one meter diameter cylindrical surfaces.

The ability to utilize the actual boundary of a test member as a diffraction wave producing means such that a change in separation between it and another diffraction wave producing means whose position is known can be monitored is a tremendous advantage, since no contact need be made with the tested member. For the vibration analyst, or in industrial dimensional measurement on moving products, for example, such non-contact operation is a virtual necessity.

Since production of the interference pattern is essentially, instantaneous, stroboscopic illumination may be used. For example, using a modulated laser source, patterns corresponding to vibrational amplitudes of objects may be "frozen" at a particular point in the vibrational cycle, or observed in slow motion. Stroboscopic illumination can also "freeze" the position of an object moving, for example, on a conveyor belt, in order that its profile be obtained using the invention.

Interference patterns may be recorded on "Polaroid" (Registered Trademark) or other photographic films and recording media for subsequent data taking by eye, or using microdensitometers or the like. Such records are of considerable use particularly in laboratory experiments, since time exposure can make up for low wave source power and analysis of such records is often easier than working with the "live" interference pattern.

When visual detection of pattern fringe positions is employed, the principal source of error is usually the eye's ability to discern the pattern minima position and not the linear measurement system used to determine $x$ or $S$.

When a sensitive photodetection means is used, rather than the naked eye, the error in fringe location can be decreased to the point where the linear measurement and detection error terms become more nearly equal. Consider the system represented in FIG. 1 by photodetector 9, moved by micrometer 10, through pattern 6, said photodetector signal feeding amplifier 11, and readout on voltmeter 12. Using a 2 milliwatt He-Ne gas laser wavesource, a UDT type PIN 20A detector, an Intersil model ICH 8500A amplifier, and a precision Boekeler micrometer, both detection and linear measurement errors are so small as to allow determination of changes in $w$ less than 0.015 microns over a wide range of $w$ values. In operation, the detector is scanned over the region $2x_n$, typically 1 to 2 cm long, with the micrometer indicating the linear movement between minima locations indicated by the voltmeter needle.

When a detector such as 9 is located at some fixed angle and used to detect the interference fringes passing said angular position with a change in $w$, no linear measurement error occurs, since the scanning motion is provided by the measured quantity itself. By combining equations 1 and 2, it is apparent that the detector will produce a simply interpretable output signal proportional to $\sin^2 w$, as $w$ changes. This output signal can therefore be used to determine changes in separation usually by counting the number of fringes of fractions thereof passing the detector. A very simple apparatus having a linear and "quasi-digital" electronic output results.

During the course of experimentation with the systems described above, I found that new and useful asymmetrical interference patterns could be generated which would be simultaneously proportional to separation in two orthogonal directions. I have coined the name "z-factor" to describe these patterns and the devices based thereon.

Figure 2:
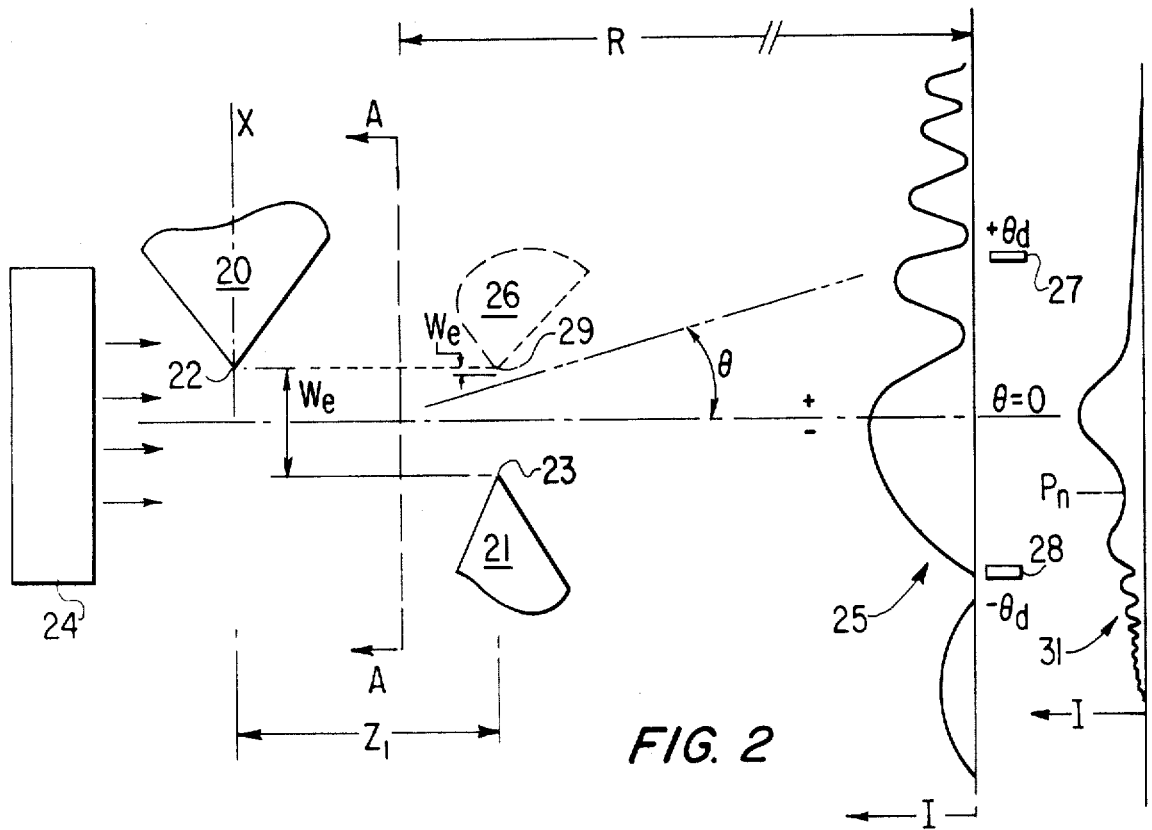
FIG. 2 is a side elevation of a "z-factor" embodiment wherein object boundaries are staggered, in the direction of incident radiation.

Shown in FIG. 2 is the basic $z$ factor arrangement, which differs from FIG. 1 in that the objects 20 and 21 containing the two diffraction wave producing edge boundaries 22 and 23 required by the invention, are separated by a distance $z_t$ in the direction of propagation of incident electromagnetic radiation as well as by an effective separation $w_e$ in the $x$ direction normal to the direction of propagation of incident radiation. When the edges are illuminated by plane waves from gas laser 24, an asymmetrical interference pattern, 25, is produced.

I have found that an equation corresponding to equation (2) can be written for this situation, $$\beta = \pi/\lambda \, w_e \sin \theta + \pi/\lambda \, z_t \, (1-\cos \theta)$$

(11)

where minima of intensity occur whenever $\beta = \pm \pi, 2\pi, 3\pi$, etc. This equation reduces to equation (2) when $z_t = 0$, as required.

Analysis of the interference pattern intensity distribution as a function of $\theta$ therefore allows $w_e$ and $z_t$ to be determined, using equation (11). This ability to determine separations in two orthogonal directions, using one laser beam and interference pattern, is a unique capability of the invention.

Before considering in more detail the characteristics of the interference pattern, it is useful to rewrite equation 11 as $$\beta = \pi/\lambda \, [w_e \sin \theta + 2z_1 \sin^2 \theta/2]$$

(12)

recognizing that the positive $\theta$ direction is that on the side of the $z$ axis where the first boundary illuminated lies.

In the small angle region where $\sin\theta = x/R$, equation (12) reduces to $$\beta = \pi/\lambda \, [x/R \, w_e + x2/2R^2 \, z_t]$$

(13)

Since integral pi multiplies of the index variable $\beta$ predict fringe minima locations, it is apparent that fringe spacings in the positive $x$ direction will decrease as a function of $x$, and will be closely spaced indeed for large $z_t$ values which cause the second term of equation (13) to predominate.

However, on the $-x$ side of the $z$ axis, consideration of equation (13) shows that for any value of $z_t$ and $w_e$ there will be some nodal position $x_{node}$ where $\beta = 0$, and fringes are noticed to approach or recced from this position just as they do from the $z$ axis (where $\beta$ also equals zero). However, at this node, intensity is a minimum since there is no superposed undiffracted background radiation.

In the arrangement of FIG. 2, discussed above, the node is not visible since it lies at an $x$ value which is always masked from diffraction waves from boundary 22 by member 21. Such nodal masking is not present if a member transparent to the electromagnetic radiation wavelength is used, as in FIG. 4.

In the internodal region between the node and the pattern centerline at $x = 0$, fringe spacing is quite large when the sum of the $w_e$ and $z_t$ terms in equation (13) is small. Negative order numbers go $1, 2 \ldots, \eta, n-1 \ldots, 2, 1$ respectively between the $z$ axis and the node. Order numbers became positive at negative values of $x$ whose magnitude exceeds that of $x_{node}$.

Because of the large fringe spacings possible in the internodal region, even in the presence of relatively large $z_t$ values, this region is usually chosen as the one in which to determine fringe movements. Such movements are generally larger in this region for any given change in $w_e$ or $z_t$ than anywhere else in the pattern.

As noted above, both $w_e$ and $z_t$ can be determined if the $x$ values at which any two particular fringe orders lie are determined, allowing solution of two simultaneous equations (14). For example if a 5th fringe order lies at $x = +3$mm, while a $n = -1$ order lies at $x = -3$mm, then for $R = 1$ meter, $\lambda = 0.6328$ microns, $w_e = 0.6328$ mm, $z_t = 281.2$ mm.

I have found the primary utility of the "z-factor" arrangement here disclosed is that it allows a large separation between boundaries thereby avoiding inadvertent boundary contact when overloads or unusual conditions occur. Of crucial importance is whether or not changes in effective separation, $w_e$, in the $x$ direction perpendicular to the incident laser beam are measurable with equal accuracy and sensitivity as the standard arrangement shown in FIG. 1, especially when small values of $w_e$ are used, Writing equation (13) in terms of $w_e$, $$w_e = Rn\lambda/x - z_t x/2R$$

(14)

and differentiating with respect to $x$ we find that $\Delta w_e = (-Rn\lambda/x2 - z_t/2R) \Delta X = \omega_e/x \Delta x$ (15)

Thus for equal fringe positional measurement errors $\Delta x$, this "z-factor" situation yields the same error $\Delta w_e$ as does the regular case, where $z_1 = 0$. Errors $\Delta x$ are in many cases less than 0.03 mm even when visual pattern detection is used, yielding values $\Delta w_e$ of under 0.1 micron when typical values of $w_e$ and $x$ are used. The fact that $w_e$ can be made small (implying high sensitivity to displacements, $\delta x$) with sufficient boundary clearance in the $z$ direction and with large fringe movements $\Delta x$ in the internodal region, is a major feature of this configuration.

In the same vein, similar relations to equation (10) are obtained by consideration of equations (11) and (7), i.e.

$$N_{\theta_d} = \frac{w_e' - w_e}{\lambda} (\sin \theta_d) + \frac{z_1' - z_1}{\lambda} (1 - \cos \theta_d)$$

$$= \frac{\delta x^{(\sin \theta_d)}}{\lambda} + \frac{\delta z}{\lambda} (1 - \cos \theta_d)$$

Where $\delta x$ and $\delta z$ are assumed to be monotonically increasing or decreasing.

When $\delta z = 0$, (11) becomes $$N_{\theta_d (w_e)} = (\delta x^{\sin \theta_d})/\lambda$$

(17)

and for $\delta x = 0$, $$N_{\theta_d (z)} = \delta z_t/\lambda \, (1 - \cos \theta_d)$$

(18)

Equation 17 is obviously the same as (10) and this means that no matter how asymmetric the interference pattern is, due to non-zero $z_t$ values, the number of fringes passing an angular position $\theta_d$ for a displacement $\delta x$ is the same.

Equation 18 indicates that fringe movements related only to $\delta z$ may be produced if $\delta x = 0$. In other words a "z only" sensor of displacement may be constructed whose count sensitivity is however considerably less than the $\delta x$ case, as can be seen from comparison of equations 16 and 17 at the small angles $\theta$ usually used in practice. Range is however much improved, and separations of up to one half meter have been determined before fringe spacing became too small to allow resolution with the detection system used.

Equation 16 can be used as the basis for a device to determine displacements in both $x$ and $z$ directions using simple equipment — namely two detectors 27 and 28 located at angles $+\theta_d$ and $-\theta_d$ respectively as shown in FIG. 2. Since the value of sin $\theta$ is positive and negative at the angular locations $\theta_d > 0$, $\theta_d < 0$ respectively, the number of fringes moving past at $\theta_d > 0$ will be $$N_{\theta_d (+)} = \delta z/\lambda (1-\cos \theta_d) + \delta x/\lambda |\sin \theta_d|$$

and at $\theta_d < 0$ (19)

$$N_{\theta_d (-)} = \delta z/\lambda (1-\cos \theta_d) - \delta x/\lambda |\sin \theta_d|$$

Since one may measure $N_{\theta_d (+)}$ and $N_{\theta_d (-)}$ representing the number of fringes passing at each detector location for the given pair of unknown displacements $\delta x$ and $\delta z$, equations (19) may be solved to give these displacements.

While each of the two detectors 27 and 28, located at angles $\pm\theta_d$ respectively sees the same number of fringes pass for a given displacement $\delta x$ ($\delta z=0$) from equation 19 above, each detector does not in general see, simultaneously, the same fringe portion.

In particular, their output signals are out of phase by $2\pi z_1/\lambda$ (1—cos $\theta$) from equation (10). Thus if $z_1$ is adjusted to be equal to $\lambda/4(1-\cos \theta)$, or an odd multiple thereof, a 90° phase shift in detector signals is achieved. In the example of FIG. 2, where sin $\theta = 0.425$, cos $\theta = 0.905$ and $\lambda = 8500$A, $z_1$ would be 3.58 microns (or an odd multiple) to achieve this condition.

This phase quadrature condition, achieved by adjustment of $z_1$, is quite important as it allows construction of a quasi digital fringe count type sensor of displacements $\delta x$ which has a bi-directional counting capability, as well as a capacity for multiplication of counts using known bidirectional counting and multiplication logic circuitry commonly used with similar phase quadrature signals.

The clearance provided by $z$ separation is also useful as it allows one object to be inside an environmental chamber or the like, with the other outside. This is of considerable usefulness in studying thermal expansion, shrinkage, etc., as an edge of the actual test member in the chamber may be used.

Also illustrated in FIG. 2 is the case where both object boundaries lie on the same side of the pattern center, the case when object 26 with edge 29 replaces 23. Just as in the previous case, $w_e$ is the difference in edge location in the $x$ direction. Positive values of $w_e$ mean that edge 29 is illuminated by the incident laser beam, the usual case. It is noted however, that over a small negative region of $w_e$ values useful pattern fringes may be obtained, even though in this case 29 is illuminated by diffracted radiation from 22.

The pattern 31 produced by this in-line arrangement contains no fringes between the node and centerline and may or may not include the node itself (point $P_N$ in FIG. 2). Because of masking of radiation from edge 22 by object 26, the pattern contains no fringes on the $+\theta$ side. The fringes are still quite useful however, particularly those closest to the $z$ axis which fringes have the largest spacing and which move most with changes $\delta x$ or $\delta z$ and are the brightest as well due to the concentration of diffracted radiation from a boundary into the region closest to the $z$ axis.

It is noted in passing that these $z$ factor situations, in which the fringes close to $z = 0$ move as much or more as those further out in $\theta$, differ considerably from the FIG. 1 case.

Another situation in which sensing or displacements, $\delta x$, between object edges $z_1$ apart may be used, is determination of angles. For example, when $\delta x$ is resolved using the invention to 0.1 micron at a $z$ separation of 10 cm, a $10^{-6}$ radian angular measurement results. This is a performance equalled only by expensive, bulky, and difficult to use autocollimater systems.

Note that it is essentially equivalent to the combination of edges 22 and 29 to locate a flat mirror in plate A—A, midway between 22 and 29, redirecting waves back onto edge 22. In this case the angulation of the mirror relative to the incident laser beam determines $w_e$, and such angulation may therefore be measured with the same accuracy quoted immediately above. Note that the angulation may also be provided by index of refraction gradients; and such gradients themselves may be measured from the change in the interference pattern produced.

While changes in $w_e$ and/or $z_1$ are most often determined between boundaries of two separate members, the invention is not limited to this case. For example, edges boundaries 22 and 29 may be located on the same member such as extruded channel traveling in the $y$ direction out of the plane of the paper. In this case, pattern 31 at a particular instant of time would be a function of $w_e$ and $z_1$, the $x$ and $z$ coordinate differences respectively of the particular section of the channel illuminated by laser 24.

It is noted that when $z_1$ values are sufficiently small, the second term of equation 14 is small with respect to the first term. Under these conditions and utilizing a pattern such as 25, $w_e$ is approximately equal to $(2R \eta \lambda)/(x_++x_-)$, where both positive and negative $x$ values are measured to the same order number. This has considerable utility in practice as $w_e$ may be rapidly determined without worrying about what $z_1$ is (i.e. without solving two simultaneous second order equations).

The invention may utilize a refractive wedge or flat mirror located between boundaries 22 and 23 (or 22 and 29) to divert both the diffracted wave from 22 and the incident beam on to 29. This is of particular use when the two boundaries form the edges of a flat object; or an object in which one boundary is obscured from the other by some intermediate portion of the object.

FIG. 3 illustrates such an example. In this case, it is desired to measure the width, $h$, of steel strip 40 moving in the $y$ direction out of the plane of the drawing. Laser beam 41 from gas laser 42 illuminates edge 43 of the strip. The undiffracted portion of the laser beam and the diffraction wave from 43 are reflected by plane mirror 44 located so as to redirect each such that a second diffraction wave is produced by the opposite strip edge 45 which interacts with the first diffraction wave to produce a $z$-factor type interference pattern 46.

The pattern 46 is equivalent to 25 in FIG. 2, as is apparent on consideration of the virtual edge position 50 corresponding to 43. Clearly, both $w_e$ and $z_1$ are a function of the strip width, and the orientation of the mirror to both the strip and the incident laser beam. In the symmetric example shown in FIG. 3, the relation is simplified such that $w_e$ and $z_1$ are a function of $d$ and the distance of the strip from the mirror, $h$. In any case, the laser beam mirror relationship is constant and determination of $w_e$ and $z_1$ from the pattern always allows strip width to be determined, at least so long as the orientation of the strip to mirror is known or remains constant, or nearly so.

If $h$ is constant in FIG. 3, all pattern changes are due to changess in strip width $d$. As shown, where the laser beam incidence angle is 45° a change in $d$ of $\Delta d$ causes $w_e$ to change by 0.707 ($\Delta d$). $Z_1$ changes by a like amount, which causes much less change in the pattern than a similar $w_e$ change and therefore may be neglected. Accordingly, if changes in strip width are desired, but one detector, 55, is required to determine changes in the pattern which can be related to changes in strip width using the previous equations.

Clearly, mirror 44 may be replaced by a system composed of a plurality of mirrors or a suitable refractive element or elements such as a prism or wedge. In fact, fiber optical waveguides of the varying index type, such as SELFOC Laser Guide, may also be used to redirect and transport the incident radiation and first diffraction wave to the region of the second boundary (45 in FIG. 3).

Note that the system of FIG. 3 is insensitive to lateral translations i.e. those parallel to the strip, functioning as long as the two strip edges are sufficiently illuminated. It is further noted that when the relative position of the boundaries used is known, the apparatus of FIG. 3 may be used to determine the distance $h$, or other angular and dimensional relationships which may be obtained from consideration of the interference pattern.

FIG. 4 illustrates use of diffraction waves from an object boundary having much greater radius of curvature than those illustrated above.

When electromagnetic radiation, such as laser beam 75, illuminates a boundary of a cylindrical object having a significant radius of curvature, such as boundary 76 of member 77, waves are both reflected and diffracted. In the shadow region ($-x$ direction in FIG. 4), only diffracted radiation appears and the angular region in which it exists is inversely proportional to the radius of curvature. In the open region ($+x$) both reflected and diffracted radiation exists with the former predominating at all but small angles $\theta$. The angle at which reflected radiation predominates is also inversely proportional to radius of curvature.

Accordingly, the larger the radius of curvature, the more limited the angular region $\pm\theta$ which can be utilized. However within this permissible region, fringes are similar to those of FIGS. 1–3 and therefore quite usable.

Diffracted waves from two cylindrical boundaries can be used to form the interference pattern of the invention, although the usual arrangement is in conjunction with a wedge shaped boundary such as those illustrated in FIG. 4, i.e. boundary 80 of object 81 (dotted lines), resulting in a symmetric pattern like FIG. 1, or boundary 82 of member 83 (dotted lines) resulting in the "$z$-factor" type asymmetric pattern illustrated in FIG. 2.

In the "$z$-factor" mode it is generally preferable to place a wedge boundary away from the laser, rather than toward it (as is 82 relative to 76), since the wedge member may then be used to mask reflected radiation from the cylindrical surface. Member 85, having boundary 86 is placed in such a manner. If member 85 is transparent, for example a thin microscope slide as shown, then no diffraction waves from boundary 76 will be masked. In this case, a nodal type pattern, 90, will be generated as predicted in the preceeding discussion, and the nodal position, $x_{node}$, will be a function of both $w_e$ and $z_1$. For a fixed value of $z_1$, $x_{node}$ is inversely proportional to $w_e$ and accordingly may be measured to determine $w_e$. Alternatively, if $w_e$ is known, $z_1$ can be obtained by determination of $x_{node}$, and for a fixed value of $w_e$, $x_{node}$ is inversely proportional to $z_1$.

In practice a thin transparent member, such as a microscope slide, effectively has two diffracting boundaries closely spaced a distance, $b$, in the $x$ direction, for example 86 and 92. The diffraction situation in such cases is similar to that of a fine wire such as 93 having a diameter, $b$, and the interference pattern 90 is accordingly formed by the superposition of three diffraction waves. The pattern fringe positions are effectively only a function of $w_e$ and $z_1$ within a small angular region about $\theta = 0$, if $b$ is small. Even when $b$ does not meet this condition, fringe movements are still due to changes $w_e$ or $z_1$ though the pattern becomes more complicated than 90 shown.

A node type pattern similar to 90 is also produced when an in-line boundary 95 of a transparent member 96 (dotted lines) is utilized.

FIG. 4 also illustrates several detection techniques. For example a single off-axis detector 100 may be utilized in conjunction with a counter to count the number of fringes, or fractions thereof passing its face, allowing a direct determination of $\delta x$ when $z_1$ is fixed. Particularly useful are two separate detectors, 102 and 103 closely located on single substrate, for example a UDT model PIN Spot 2D. When the outputs of each detector are fed to a differential amplifier 104, a plus or minus signal is available to drive center zero reading meter 105, thereby indicating the direction of change as well as magnitude. Such a system may be used to "track" the node position over a small range, as shown. The meter reads zero for each change of fringe slope (i.e. at each maxima and minima), and a total of 2 $N_{\theta_d}$ counts are thus obtainable.

Another detection means capable of scanning a whole section of pattern is linear detector array 110, such as Reticon Corp. model 256D having 256 detector elements on 0.05 mm. centers. Such an array, which is usually scanned in such a manner as to be classified as a one-dimensional television camera, allows multiple fringe positions to be determined thereby providing a means for rapid determination of $w_e$ and/or $z_1$.

The final detection means shown in FIG. 4 as a "matching" system comprised by filter 115 and photocell 116. At some time when $w_e$ and $z_1$ are equal to some initial value, a negative of the resulting interference pattern is made which is then used as a filter for subsequent patterns. When the same combination occurs again, detector 116 reads a minimum value of transmitted light, thereby indicating a "match". For small displacementss $\delta x$ and/or $\delta z$ about the match position, detector output is proportional to displacement(s).

Before leaving FIG. 4 it is noted that the "$z$-factor" arrangement can be used to determine widths of objects, such as cylindrical object 77, which might be moving on a conveyor belt, in the $x$ direction in FIG. 4. This may be accomplished by using two stations an $x$ distance greater than the object width apart and determining $w_e$ values at each by strobing both lasers when the object is in between stations. Alternatively, if the conveyor velocity $v_x$ is known, then a timing circuit may be used to determine distance between the time the leading and trailing edges of the object were separated the same value $w_e$ with the boundary (e.g. 86) of another member spaced in $z$ direction.

At present, the most important industrial application of my diffractographic invention, particularly in its "$z$-factor" version, is the gaging of sheet material thickness, including the thickness of coatings thereon.

Considering the apparatus of FIG. 4, it is evident that if a piece of sheet material were wrapped around the surface of cylindrical object, 77, the separation $w$ or $w_e$ would decrease by the amount of the sheet thickness. The resulting change in the diffraction wave interference pattern therefore greatly magnifies sheet thickness and the invention therefore makes an excellent sheet thickness monitor, since no contact is made with the sheet by the sensing mechanism. Contact, however, must be maintained against the reference surface such as that of object 77 in FIG. 4, which may be a cylindrical roller normally used in sheet manufacturing processes.

The diffraction wave from the sheet is generated at the point of tangency of the incident laser beam with the sheet. In most practical cases, interference occurs with the diffraction wave from a single reference edge, such as the edge 80 of object 81 or edge 85 of object 86 in FIG. 4, which is usually located so as to be spaced in the direction of laser beam propagation, or $z$ direction, from the point of sheet tangency. Use of this "$z$-factor" arrangement is essential in most applications to provide clearance and is illustrated in FIG. 5 described below.

Figure 5:
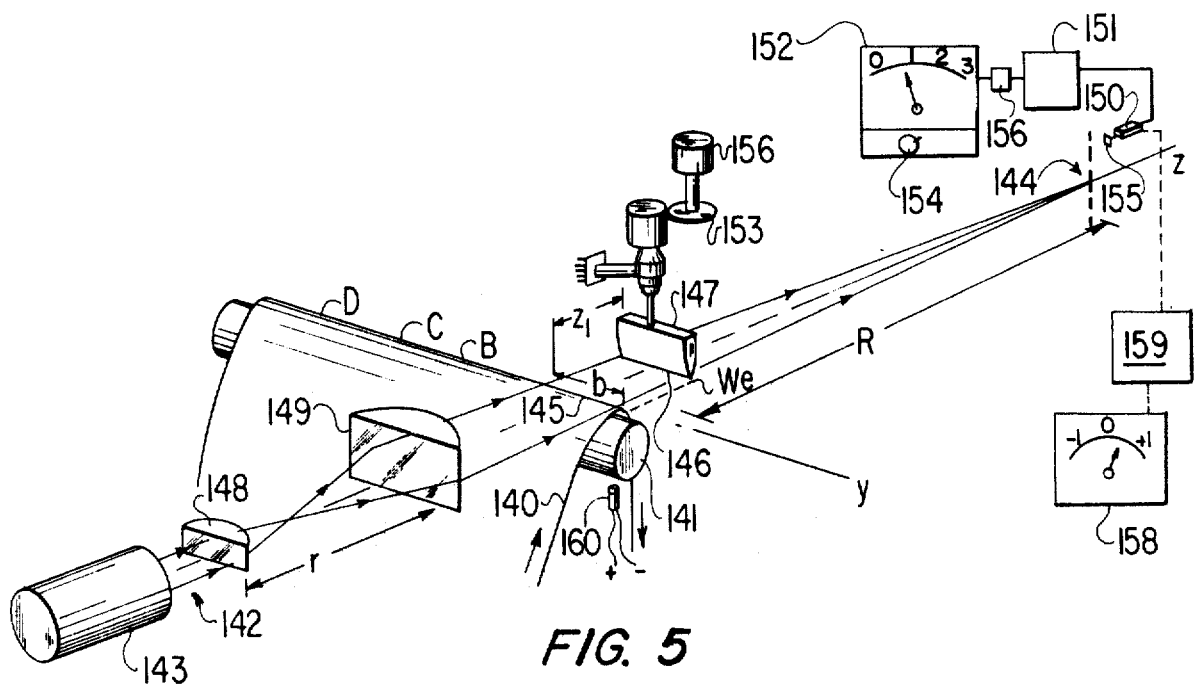
FIG. 5 is a perspective view of a diffractographic sheet thickness gaging system.

In a typical example, illustrated in FIG. 5, it is desired to measure the thickness of a plastic coatings aplied to a sheet material such as paper or mylar in what is known as a "conversion" process. As shown, sheet material 140, initially uncoated, is passed around roller 141 and upon illumination by waves 142 from gas laser 143, a "$z$-factor" type interference pattern 144 is formed due to interference of diffraction waves from the tangent point on the sheet surface 145 and edge 146 of member 147 located a distance $z_1$ from said point of tangency.

In this particular example, an optional cylindrical lens system composed of cylinder lenses 148 and 149 is used to expand the incident laser beam so as to produce diffraction waves from a total length $l$ of the surface of the sheet material. By adjusting the separation, $r$, between the two lenses, the diffracted waves from the sheet and the edge boundary 146 may be focused at any distance R as shown (R> >$w_e$). A spherical lens system may also be used for this purpose but is less efficient in its use of incident laser power.

Before discussing operation of this embodiment of the invention, it is necessary to state the assumptions involved. First, one must assume that the roll surface and reference edge are fixed, or at least in known relationship to each other, in order that changes in $w_e$ are due only to changes in sheet thickness, as desired.

This assumption may be easily satisfied if the roll does not roll, i.e. if the sheet slides over a cylindrical surface, perhaps coated with teflon or in some other way made a low friction contact. The rolling contact situation is more common however, and means for dealing with the problems created are discussed in the embodiments following.

A second assumption is that the sheet material is always in contact with the roll surface, at least at the point of tangency. Using reasonable tensions, this has been the case in all operation to-date.

When coating thickness is desired, it is necessary to assume that the sheet thickness on which the coating is applied is constant, or otherwise compensate in some manner. For example, measurements of coated and uncoated sheet may be made and results subtracted to get coating thickness.

Consider the operation of the FIG. 5 apparatus. Sheet material, for example mylar or paper, is threaded through the machine and around roller 141 and wound onto a take up reel (not shown). A spring loaded idler roller, also not shown for clarity, maintains the sheet at some constant initial tension, T, preventing excessive deflection of the roller 141 due to tension surges of the sheet.

Initial set-up of $w_e$ relative to the uncoated sheet depends on the detection system used to determine fringe position in pattern 144. For example, if a detector array such as 110 in FIG. 4 is utilized, the pattern may be scanned to determine the location of a particular fringe and therefore $w_e$ directly. Similarly, changes in $w_e$ due to sheet coating thickness can be determined. Thus, with such a detection system, the only set up involved is to obtain an initial, uncoated, $w_e$ reading, an operation which may be performed electronically on command by the operator.

While the aforementioned pattern scanning detection means can accommodate a wide range of sheet thickness, the detection and computational circuitry is relatively costly. Accordingly, a simpler means is illustrated in FIG. 5, wherein a photo detector 150 such as a UDT Pin 20A is amplified by amplifier 151, whose output is monitored by voltmeter 152.

The detector 150 is located at a given $x$ position, the second fringe minima, for example, is caused to fall on the detector by adjustment of the position of edge 146 in order that meter 152 read a minimum value for the initial no-coating condition. When coating is applied, the fringe obviously moves toward a larger $x$ value and the detector meter reads a value more or less linearly related to the fringe movement.

By using a micrometer such as 153 to precisely move the reference boundary 146 to simulate the change in $w_e$ due to an applied coating, the dial of meter 152 may be calibrated in terms of coating thickness. A zero bias actuated by knob 154, is employed to make the needle read zero, whatever the initial no-coating, minimum signal voltage.

This system has worked well in practice, and can typically resolve coatings to 0.3 microns in a stable manner. A narrow band pass interference filter 155 is usually employed to negate changes in ambient light. Laser power and amplifier drift must be controlled to within the precision desired.

A capacitive filter network such as 156 is usually employed to average oscillations due to roll bearing run-out, deviations in roll geometry and minor vibrations. All these are usually in excess of 3 Hz and easily filtered. In addition, such filtering averages undulations in the substrate and therefore the coating thereon.

Substrate undulations in the transverse direction are further averaged by action of cylinder lens 149 used to focus a strip of width $l$ on to the detector. This also allows significant coating skips occuring within the width $l$ to be picked up by the detection system.

Generally speaking, roll rotational undulations can generally be kept to within ±3 microns, at least with unworn bearings. Where such undulations are a problem, laser 143 may be stroboscopically modulated at the roll rotational rate so as to always illuminate the sheet when the roll is in the same position, thereby largely cancelling the roll undulation problem.

Operationally, adjustment of micrometer 153 to position a particular fringe on the detector is difficult to do manually by an untrained operator. Accordingly, it is desirable to have an automatic system which may be accomplished by use of a motor drive 156 controlled by the detector circuit. On a first manual command, the motor drives edge 146 past $z = 0$. The resultant cut off of detected light is sensed by the detector and a reverse command given the motor which pulls the edge back until the first, second, or whatever desired minimum is detected, at which time the motor is cut off.

In many cases, particularly those where the same thickness of substrate (e.g. 0.02 mm mylar) is used, fringe position varies little from run to run. In these cases it is often satisfactory to set the detector meter to zero by just using the bias adjust, 154. This effectively means that $\theta_d$ is slightly in error, implying an equal amplification error. Note that this zero adjust method is satisfactory only if the fringe always falls at an equal or greater value of $x$ than the detector location. This proviso is not required with the Dual Photocell arrangement described below. Note too that motor 155 can be used to set a new edge position usable with another substrate in this manner.

An alternative, though similar, detection scheme is to use a dual photocell combination such as 102 and 103 in FIG. 4, located at angle $\theta_d$, as detector 150. In this instance edge 146 is positioned initially such that a center zero reading meter such as 158, driven by differential amplifier 159, (connected by dotted lines) reads minus the value of sheet coating desired. Then when the desired coating is applied, the needle reads zero, with any ± readings indicating tolerance deviations. Such dual cells are desirably less sensitive to ambient lighting changes, ageing and voltage instability than single detectors.

Note that where excessive roll motions are encountered, an independent measure of roll positional changes from an initial value, for example using capacitance sensor 160, can be made and the suitably amplified signal obtained subtracted from that of detector 152. More stability is gained however if another diffractographic system is used for the purpose.

With the availability of dye lasers having a continuously variable wavelength, coating thickness may be determined by varying $\lambda$ until an initial fringe reading is obtained, e.g. zero on a dual cell meter. The amount of $\lambda$ variation directly giving $\delta x$ due to coating thickness utilizing the formula:

$$\delta x = \eta R/x (\lambda_1 - \lambda_2).$$

In many instances it is desired to sense coating or sheet thickness at many positions across the sheet. Accordingly, additional stations of the type described can be employed, for example at positions B, C, and D. The detector outputs from each may for example be fed to a CRT bar chart display to give a whole width profile, recorded on chart paper, or the like.

A large number of stations may be required if it is desired to check all sheet manufactured, a desirable result from a quality control point of view as it allows immediate detection of coating skips which may be only 5 mm wide. For example, 24 stations each illuminating a 5 cm strip $l$, have been proposed for a 120 cm wide sheet application.

A number of stations may employ a single detector system by directing each pattern to it in succession using appropriate optical elements. In addition, a single laser beam may be divided into many sub beams, one for each station.

Figure 6:
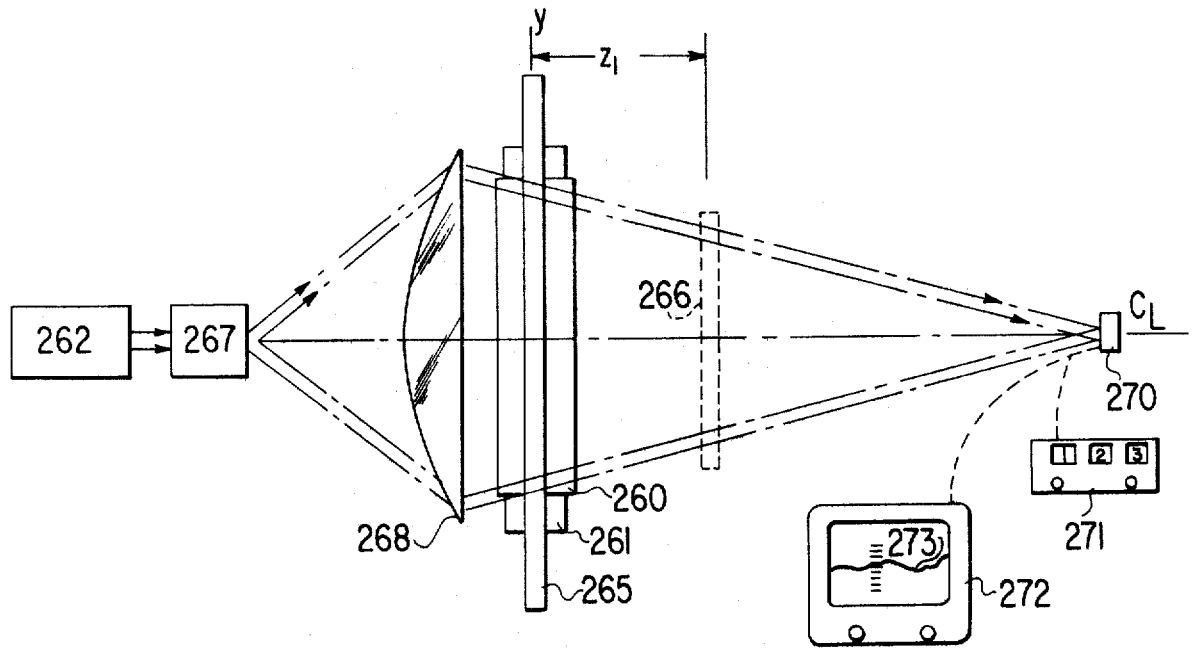
FIG. 6 is a top view of a scanning type sheet thickness profile gaging system.

In FIG. 6 another embodiment of a sheet thickness checker is shown, capable of obtaining a continuous or multipoint thickness profile across an entire sheet. Here a sheet of material 260 moving in the direction shown, is tensioned around cylindrical roller 261. A beam from laser 262 is directed along a tangent to the sheet such that the sheet boundary together with the reference boundary of object 265 each diffract incident radiation to form an interference pattern a distance away, as in FIG. 5.

As further described above, it is usually advantageous to place the reference boundary (or boundaries, if like the items 86 and 92, or 93 in FIG. 4 above) a distance $z_1$ away from the sheet tangent boundary, as shown using member, 266, instead of 265.

To obtain essentially instantaneous operation capable of stopping the motion of the sheet material to a high degree, high speed rotating mirror or electro-optical beam scanner 267 is utilized to scan the beam across the sheet. The interference pattern sequentially resulting from each position on the sheet is focused by cylinder lens 268 onto linear detector array 270, such as the Reticon Corp. 265D, having a 256 photodiodes on 0.05 mm centers, shown in FIG. 4 as item 110.

A computer connected to the linear detector array output circuitry may be programmed to determine $x_n$, $s$ or $f$ at each position across the sheet which can be reliably indicated by drive circuitry of the scanner mechanism, typically 400 positions. Profile information is thus generated, though for pattern fringe positions to be relatable to sheet thickness, it is essential that the roll surface be a constant or at least known distance away from the reference edge and that the sheet contact the roll at all points. If these conditions are satisfied, then a sheet thickness profile at any instant of time can be obtained by illuminating locations along the sheet width (in the $y$ direction out of the paper) and analyzing each interference pattern to obtain $w_b-w_a$, $w_c-w_a$, etc.

Because of the very high speeds of some processes, the time involved to scan and compute $x$, $s$ or $f$ using even high speed linear array scanners or TV cameras may be too long unless just a few detector elements are scanned. Of considerable utility therefore is the off-axis detection technique described relative to FIGS. 1–5 above, wherein a single detector 270 located at an angle $\theta_d$ in the diffraction pattern counts the number of fringes or fractions thereof passing its face, in this case as $w$ or $w_c$ changes due to sheet thickness as the laser beam is swept down the boundaries. When $z$ factor is used and a second detector is located at $-\theta_d$ as shown in FIG. 2, bi-directional signals are obtained which indicate whether a counter 271 should add or subtract the fringe counts corresponding to depressions and humps in the sheet material. Therefore, if a zero count corresponds to the edge of the sheet where the sweep begins, the number of counts at any given location across the sheet gives the profile deviation from the edge. The counting and comparison (to stored tolerance values) circuitry required can be extremely fast — a requirement, if it is desired to essentially gage all product produced.

The sheet width which can be checked in this manner is limited to the width of the cylinder lens, concave mirror, fibre optic bundle or other means used to collect the diffracted radiation. Thus about one meter sheet is perhaps the limit for the apparatus, beyond which one could use separate systems for different sections of the sheet. For example, it has been proposed to use eight lasers, scanners, and 12.5 cm width lenses to cover a 1.2 meter sheet. Eight detectors would also be used in this case. Each of the eight sections can be scanned in turn, or simultaneously.

Detector 270, which may be either a single or split detector of the type described above, may also be used where small fringe movements are involved to provide a voltage output signal proportional to $w_e$ and therefore sheet thickness which may, after suitable amplification, be used as the $y$ input to a CRT display 272 whose $x$ sweep rate is synchronized with the scanner 267. This results in a full width profile representation, 273, of the sheet thickness. If roll undulations are a problem, the scan can be made over a period of time small with respect to the roll rotational period and synchronized with the roll rotational rate.

Other detection schemes may also be used. For example, the filter arrangement of FIG. 4, items 115 and 116 could be substituted for detector or detector array, 270.

If lens 268 in FIG. 6 were dispensed with, an interference pattern proportional to each point on the roll would be generated at a unique position in space, and if the sweep rate were say 15 Hz, or greater, the eye would perceive a stationary, flicker-less, two dimensional interference pattern representing the surface of the sheet expanded in the $y$ direction.

Figure 7:
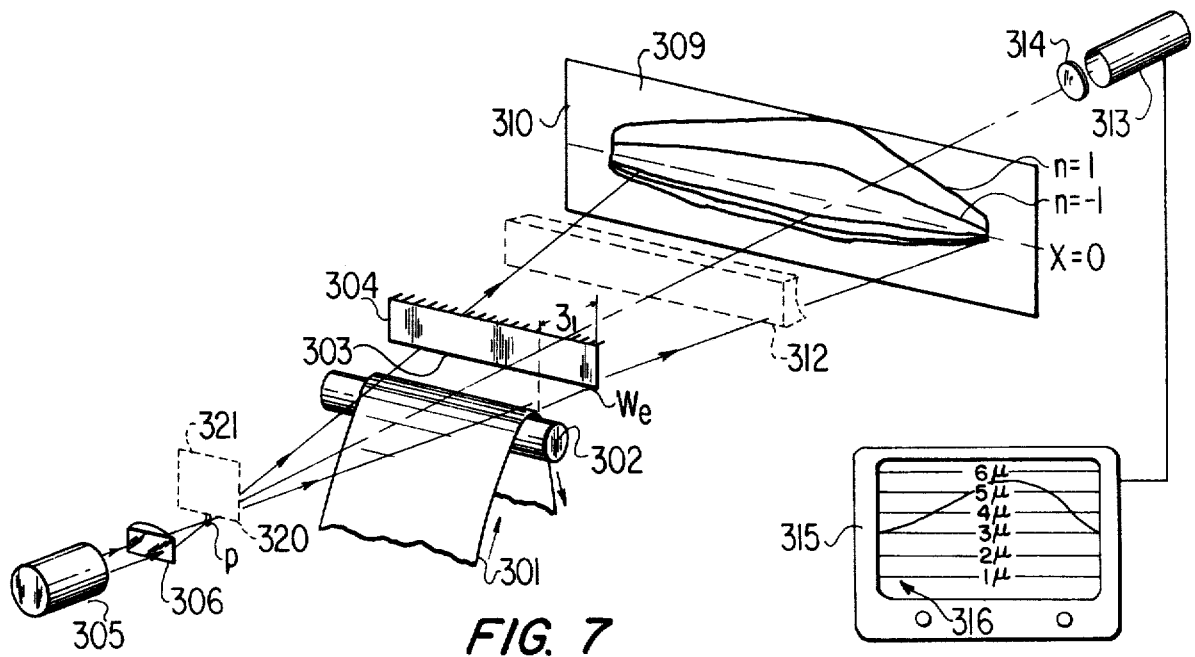
FIG. 7 is a perspective view of an embodiment of the invention generating a z-factor profile "image" of a sheet surface.

Such a two dimensional pattern can be produced simultaneously, as shown in FIG. 7. Here a sheet of coated magnetic recording tape 301 passing over roll 302 together with reference boundary 303 of member 304 are illuminated by gas laser 305 whose radiation is spread in a "fan" by cylinder lens 306.

The two dimensional fringe pattern 309 produced on screen 310 gives an immediate, continuous on-line representation of the sheet contour, which, in the example, is thinner on the edge than in its center. Magnification in the $y$ direction depends on the choice of cylinder lens focal length, and R value utilized. As before, $x$ direction magnification of thickness can be 1000 or more in normal situations and can be further increased using optional cylinder lens 312 (dotted lines).

For most industrial situations, direct observation of the fringe pattern is not sufficient due to a lack of usable laser power. An easy expedient is to use TV camera 313 equipped with narrow band pass interference filter 314 to admit only laser radiation. By directing one or more fringes of the pattern directly onto the TV camera face (perhaps with the aid of optical elements not shown), an enlarged representation of the sheet surface may be produced on a TV monitor 315 which is easily visible in a lighted area. Total magnification in this situation is typically 15,000. Because of the high magnification and the desirability of producing a non-confusing display, only one or two fringes are usually shown. Changes along the length $y$ can be relatively determined using a template 316 superposed on the TV screen as illustrated.

The reference boundary does not have to be as long as that of member 304. It may for example be located at the focal line P of the cylinder lens 306 as represented by boundary 320 of member 321 (dotted lines). Thus no requirement for boundary members precisely manufactured along their total length is required.

In a similar fashion, the focal line P of cylinder lens 306 may be focused onto the sheet, resulting in a pattern proportional to thickness undulations over the very small focal region. In this case geometrical magnification in the $y$ direction may reach several thousand times.

Clearly, the two-dimensional profile pattern produced may correspond as well to that of an object, such as a roller bearing, having a quasi-straight profile similar to that shown of the sheet passing over a roll. Thus bearings, razor blades, and other profiles can be similarly monitored, for example on a transfer line wherein said bearings move in the direction of their axis (i.e. $y$ direction) or are brought past a checking station on a conveyor moving in the $x$ direction.

Two other important features can be obtained by focusing the cylinder lens in such a manner. First, it may be used to allow but essentially a single $w$ or $w_e$ value to contribute to a detected interference pattern, whose fringes are straight and perpendicular to the cylinder lens axis. Second, by the action of the cylinder lens, and especially lenses of short focal lengths (eg. 20 mm or less), even grossly non-parallel propagation directions of diffracted waves from two boundaries can result in interference patterns possessing usable fringes over some reasonable angle $\theta$. To-date, reference edge-object non-parallelisms of up to 70° have been made to form usable interference patterns in this manner.

Both of the embodiments illustrated in FIGS. 6 and 7 are capable of generating an essentially instantaneous profile of the sheet thickness, which may be used to monitor presence of local deformaties as well as changes in gage during the process run. In many industrial situations however, it is only this last quality which is of importance and accordingly a much slower generation of profile information can be tolerated.

Clearly, one means of generation of profile information is to use a large number of positions of the type illustrated in FIG. 5, essentially covering the whole sheet width in discrete steps. This could be accomplished at high or low speed depending on the means for switching between positions, or simultaneously using independent readout channels.

Figure 8:
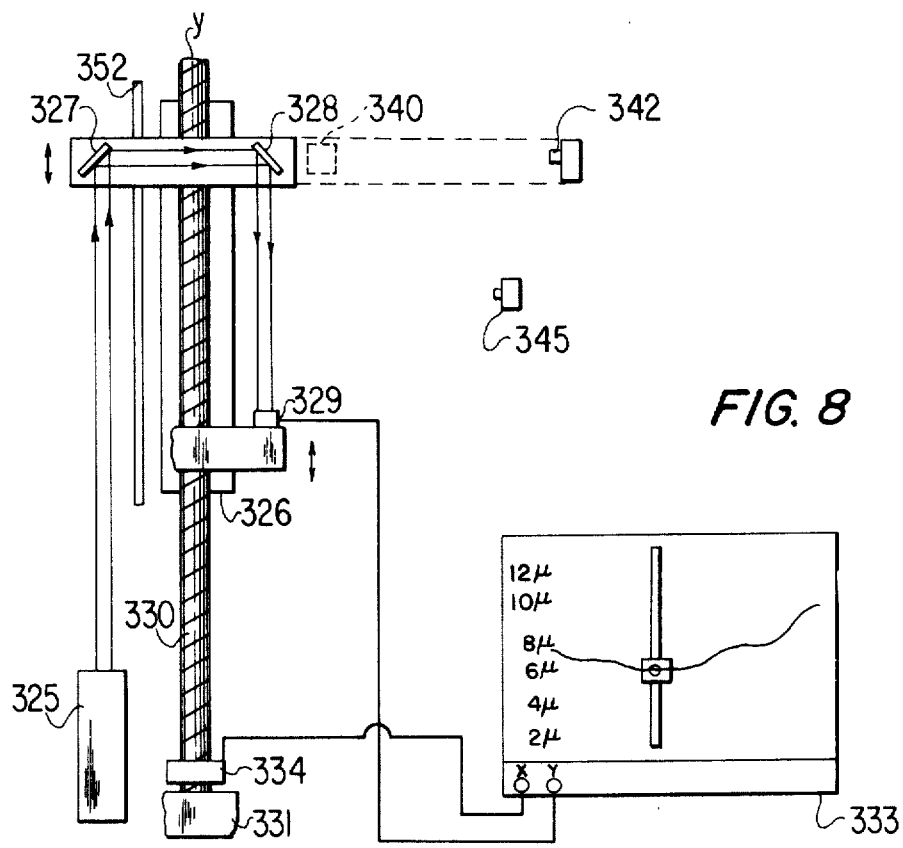
FIG. 8 is a perspective view of a mechanical scan embodiment of the invention, used for determining sheet thickness profiles.

Alternatively, the apparatus of FIG. 5 could be mechanically translated across the width of the sheet, producing a slow, continuous scan. Accuracy of course depends largely on the precision with which the reference boundary-roll relationship can be maintained during the scan. However, any repeating scan error, causing a false change $w_e$ due to the scanning mechanism, can be subtracted out from the answer received at each position across the sheet. Such an error could be determined before operation of the process by merely scanning the roll surface with no sheet in place or, in the case of coating processes, a pre-scan of the substrate sheet to be coated. A generally improved mechanical scan arrangement is shown in FIG. 8, utilizing a fixed elongate reference edge as in FIG. 6.

As shown, laser 325 is located at the side, parallel to the axis of roll 326. A scanning head, comprising mirrors 327 and 328, together with detector 329 moves across the roll under the action of mechanical screw translator 330 driven by motor 331. Suitable guide mechanisms to insure accurate translation with negligibly small rotation have been omitted for clarity.

The diffraction wave interference pattern resulting from diffracted wavefronts from the roll surface and the boundary of reference member 332 is detected in the same manner as in FIG. 5 by detector 329 which is also translated by the scan mechanism so as to maintain a fixed R. The detector output is fed to an $x$–$y$ plotter, 333, whose $y$ axis information is obtained from a shaft encoder 334 attached to the screw mechanism.

This system is very compact and is reasonably free of operational problems as long as the detector and mirrors are rigidly fixed and thereby respond in unison to vibrations and other forces. As in previous embodiments, the reference boundary-roll relationship must be known, or at least averageable. If averaging is required at each position, the scan rate must be slowed accordingly. In cases where this is intolerable, it is often best to strobe the laser at the roll rate.

Several alternative versions are possible. For example, the laser could be part of the scanning head and mirror 327 dispensed with. This would be particularly attractive if a small semi-conducting diode laser were utilized, a perfectly reasonable alternative to the gas lasers shown to this point. Alternatively, a SELFOc or other $TEM_{\infty}$ mode fibre optic waveguide could be used to transport gas laser radiation from a remote location to the scanning head.

Another alternative utilizes a mirror 340 (dotted lines) attached to the scan head to direct diffracted radiation in the $x$ direction perpendicular to the sheet where a detector, not shown, also fixed a distance away from the mirror and moving with it, is located.

As a further alternative, mirror 328 can be eliminated and detector 329 located at a position 342 a fixed R distance in the $z$ direction from mirror 327, as shown in dotted lines.

In these alternative scanning embodiments it is desirable to keep the arm connecting detector and scan head as short as possible. The resulting short R values however, may be increased using mirrors to multiply the optical beam path within a given distance, or by using a cylinder lens to expand a given fringe region, and its movements, incident on the detector.

A final alternative here discussed, is to locate the detector at a fixed position, say position 345 as shown, and rotate mirror 327, using a cam, tracking, or other system so as to always maintain the interference pattern on the detector. Thus mirror 327 would be oriented 45° to the laser beam position shown, only when the scan head was in the center of the roll.

In FIG. 8, sheet passing over the roll has been omitted for clarity, and it is understood that the system functions as a sheet thickness or coating thickness checker just as the previous embodiments.

In the preceding embodiments, measurement of sheet thickness is based on a fixed or known spatial relationship between the roll surface and the reference boundary(s). As mentioned, a sufficiently fixed relationship, perhaps containing small periodic (and therefore averageable) oscillations about a mean value, can usually be achieved in practice, and if so, simple systems such as shown in FIG. 5 may be used.

Figure 9:
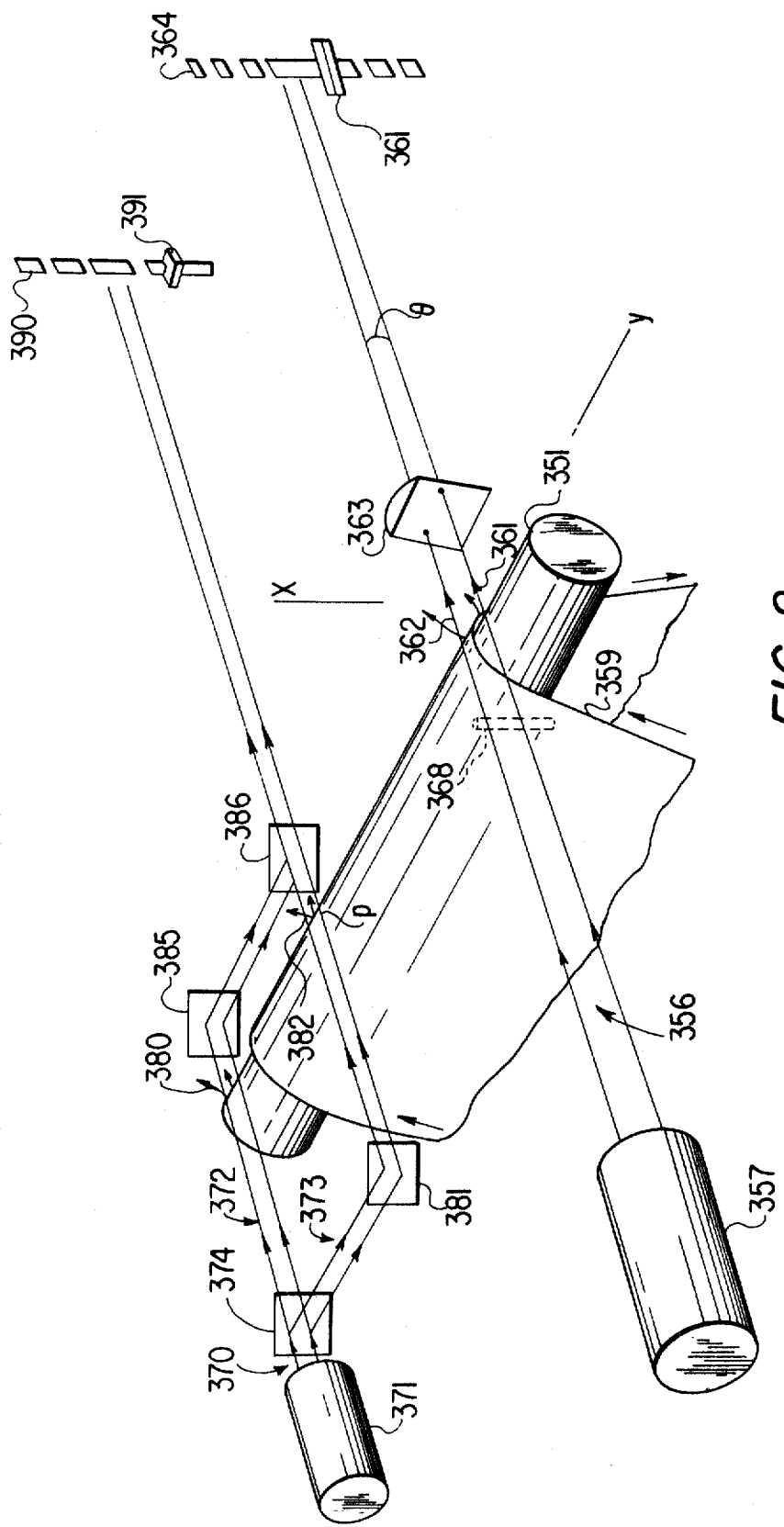
FIG. 9 is a top view of a local reference wave embodiment of the invention.

A system not dependent on such a relationship and therefore free of problems in this regard, is shown in FIG. 9. Here a laser beam 356 from laser 357 proceeds tangent to the roll 358, about which is tensioned sheet, 359, whereupon two diffraction wavefronts 361 and 362 are created at the points of tangency with the roll and sheet surface, respectively.

The two diffraction wavefronts are superposed by the action of lens 363 forming a diffraction wave interference pattern 364, a distance R away.

Because the individual wavefronts are related in phase in the $y$ direction due to the lens convergence angle $\phi$ as well as in the $x$, or diffraction, direction the fringes formed are canted as shown. Generally speaking, when small convergence angles $\phi$ are used, as in this example, the fringes are nearly parallel to the $x$ direction for very small separations $w_e$ or $w$ and become nearly parallel to the $y$ direction as the separation increases, in this latter instance having the appearance of the pattern obtained in the examples above.

For small separations $w$, as are commonly found in sheet thickness measurements of packaging materials, a split detector, 365, having a linear axis of symmetry must be oriented at an angle as shown and is usable only over a small range of $w$ values. While this is usually satisfactory, a single circular or "point" detector may be used to allow detection and counting of fringe movements over a wider range of separation changes.

The fringe positions are clearly proportional only to sheet thickness changes, since the angle $\phi$ is fixed by the apparatus.

Use of the roll surface itself to locally generate a reference diffraction wavefront has advantages in many applications. For the immediate problem of sheet thickness determination, it quite clearly makes the pattern fringe positions independent of the oscillation of the roll in it's bearings, and further does not require any stiff or elaborate connection between the roll and an external reference boundary.

Clearly coating thickness on sheet material can also be determined and if desired beam 356 can be directed at an uncoated edge of the sheet rather than the roll surface.

In the example shown it is desirable that each diffracted wavefront be the same intensity or nearly so. This is accomplished by illuminating equal lengths of roll and sheet surface. Where sheet edges are to be neglected, an optional linear blocking object mask, such as wire 368 (dotted lines) can be inserted at the sheet edge position to prohibit spurious diffraction from the edge.

Where an interior position of the sheet is to be gaged relative to the roll surface not covered by the sheet, it is obvious that the angle $\phi$ would have to be increased, in the apparatus on the right hand side of FIG. 9. This is not, in general, desirable as it causes too much $y$ direction phase difference and results in a multitude of internal $y$ direction fringes. While not unworkable, this makes the pattern confusing and it is generally preferable to use essentially zero $y$ path difference systems such as discussed below.

Consider the system shown on the left hand side of FIG. 9. Beam 370 from laser 371 is split into two orthogonal beams 372 and 373 by beam splitter 374. Beam 372 is directed at the roll boundary producing diffraction wave 380, while beam 373 proceeds parallel to the roll axis until being redirected as shown by plane mirror 381, so as to be incident on the sheet boundary at point P producing diffraction wave 382 proceeding in a plane parallel to that of 380.

The two diffraction waves 380 and 382 from the roll reference point and point P on the sheet, respectively are superposed by means of mirror 385 and beam splitter 386 so as to have very little path difference in the y direction. Y path difference and therefore the number of fringes in the y direction, is controllable by tilting mirrors in the system.

In this situation the fringe pattern 390 is very much like that of FIG. 1. It is noted however, that for small sheet thickness (and therefore w), say less than 0.03 mm, it is usually desirable to have some y direction fringes and observe their movement as w changes.

If carefully constructed, and by usually replacing the mirrors 381 with a right angle prisms, point P may be scanned down the sheet by moving mirror 381, beam splitter 386, and detector 391 parallel to the roll axis.

The foregoing local reference wave concept is clearly not limited to checking of sheet material, and may be used, for example, to determine differences in position of two objects. In addition, profile deviations of object surfaces may be obtained. For example, consider the roll 358 to be a high quality drinking glass having a gold foil coating 359 whose thickness is desired. The FIG. 9 embodiment may obtain this thickness even though the glass might be moving on a conveyor belt in the x direction. In fact, a big advantage results because there are no z changes to account for as in the similar situation discussed relative to FIG. 4 above. In addition, the system is self-synchronizing, that is a pattern is produced only when the glass boundaries are in the laser beam, and is the same no matter wherein the beam the boundaries lie.

What is claimed is:

1. A method of determining the relative position of at least two boundaries comprising the steps of:
   directing electromagnetic waves onto at least one first boundary to produce a first diffraction wave;
   directing electromagnetic waves onto at least one second boundary to produce a second diffraction wave, said second boundary being spaced from said first boundary in the direction of propagation of said electromagnetic waves, said first and second diffraction waves interacting to produce an interference pattern; and
   determining from said interference pattern the relative position of said first and second boundaries, in a direction transverse to said direction of propagation, or in said direction of propagation, or in both of said directions.

2. A method according to claim 1 wherein one of said boundaries comprises a moving surface.

3. A method according to claim 2 wherein said moving surface is a surface of a sheet material.

4. A method according to claim 3 wherein said sheet material is moved over a curved surface.

5. A method according to claim 4 wherein said curved surface comprises a rotatable cylindrical roller.

6. A method according to claim 5 wherein the position of said curved surface relative to said boundary not comprised by a moving sheet is known such that sheet thickness may be determined.

7. A method according to claim 4 wherein the position of said sheet surface boundary relative to the other boundary is known such that the thickness of a coating on said sheet may be determined.

8. A method according to claim 1 wherein said first and second boundaries are on single member.

9. A method according to claim 1 wherein said electromagnetic waves are produced by a laser.

10. A method according to claim 1 wherein the boundary more remote from the source of electromagnetic waves comprises a material transparent to said electromagnetic waves.

11. A method according to claim 1 wherein changes in relative position of said boundaries are determined from the interference pattern using two detectors each at the same angular position relative to the axis of the direction of propagation of electromagnetic waves but located on opposite sides of said axis.

12. A method according to claim 11 wherein said boundaries each lie on a separate member and each member is spaced in said direction of propagation a distance such that fringe positions at each of said detectors are 90° out of phase with each other.

13. A method according to claim 1 wherein the path of said electromagnetic waves is deviated prior to production of said second diffraction wave.

14. A method according to claim 3 wherein said electromagnetic waves produce diffraction waves from an elongate region of said sheet material and said waves are focused to form essentially a unitary average interference pattern.

15. A method according to claim 3 wherein a multiplicity of separate patterns are produced corresponding to the relative position of various portions of the sheet relative to positions on one or more other boundaries.

16. A method according to claim 1 wherein said waves are sequentially directed to a plurality of locations across the length of one of said boundaries.

17. A method according to claim 1 wherein said electromagnetic waves are directed onto a continuum of first and second boundary locations to produce a continuum of adjacent interference patterns.

18. A method according to claim 1 wherein electromagnetic waves are directed onto a continuum of first boundary locations and essentially a single second boundary location.

19. A method according to claim 1 wherein said first and second diffraction waves emanate in a plane and wherein said first and second boundaries are spaced in a direction making a non-zero angle with the plane of the diffracted waves.

20. A method of determining the relative position of at least two boundaries comprising the steps of:
   directing electromagnetic waves onto at least one first boundary to produce a first diffraction wave, said first wave emanating in a plane;
   directing electromagnetic waves onto at least one second boundary to produce a second diffraction wave, said second wave emanating in a plane, said second boundary being spaced in a direction making a non-zero angle with the planes of the waves diffracted from said boundaries;

causing said first and second waves to interact to produce an interference pattern; and determining from said interference pattern the relative position of said first and second boundaries.

21. Apparatus for determining the relative position of at least two boundaries comprising:

means for directing electromagnetic waves onto at least one first boundary to produce a first diffraction wave;

means for directing electromagnetic waves onto at least one second boundary to produce a second diffraction wave, said second boundary being spaced from said first boundary in the direction of propagation of said electromagnetic waves, said first and second diffraction waves interacting to produce an interference pattern; and means for determining from said interference pattern the relative position of said first and second boundaries, in a direction transverse to said direction of propagation, or in said direction of propagation, or in both of said directions.

22. Apparatus according to claim 21 wherein said electromagnetic waves are produced by a laser.

23. Apparatus according to claim 21 including photodetector means for detecting a portion of said interference pattern.

24. Apparatus according to claim 23 wherein said photodetector means comprises a pair of closely spaced photocells.

25. Apparatus according to claim 21 including scanning means for determining fringe positions in said interference pattern, said scanning means comprising a plurality of photosensing elements reponsive to the wavelength of electromagnetic radiation used.

26. Apparatus according to claim 25 wherein said scanning means comprises a photodiode array.

27. Apparatus according to claim 25 wherein said scanning means comprises a television camera.

28. Apparatus according to claim 21 including two photodetector means each being located at the same angular position relative to the axis of the directon of propagation of said electromagnetic waves, but located on opposite sides of said axis.

29. Apparatus according to claim 21 including means for adjustably moving one of said boundaries a known distance relative to the other boundary.

30. Apparatus according to claim 21 including means for sequentially directing electromagnetic waves to a plurality of locations across the length of one of said boundaries.

31. Apparatus according to claim 21 including a cylinder lens for diverging said electromagnetic waves.

32. Apparatus for determining the relative position of at least two boundaries comprising:

means for directing electromagnetic waves onto at least one first boundary to produce a first diffraction wave emanating in a plane;

means for directing electromagnetic waves onto at least one second boundary to produce a second diffraction wave emanating in a plane, said second boundary being spaced in a direction making a non-zero angle with the plane of the waves diffracted from said boundaries;

means for causing said first and second waves to interact to produce an interference pattern; and means for determining from said interference pattern the relative position of said first and second boundaries.

33. A method according to claim 1 wherein said first and second boundaries are separated a known distance in the direction of propagation of said electromagnetic waves and wherein the relative position of said boundaries in said transverse direction is determined.

34. A method according to claim 1 wherein said first and second boundaries are separated a known distance in a direction transverse to the direction of propagation of said electromagnetic waves and wherein the relative position of said boundaries in said direction of propagation is determined.

35. A method according to claim 1 wherein said first and second boundaries are separated a fixed distance in the direction of propagation of said electromagnetic waves and wherein change in the relative position of said boundaries in said transverse direction is determined.

36. A method according to claim 1 wherein said first and second boundaries are separated a fixed distance in a direction transverse to the direction of propagation of said electromagnetic waves and wherein change in the direction of propagation is determined.

37. A metal according to claim 1 including the step of detecting the intensity of electromagnetic radiation in said interference pattern with detection means located at a fixed distance from the axis of said interference pattern to detect a portion of the interference pattern, and determining said relative position from said detected intensity.

38. Apparatus according to claim 21 further including means for fixing the position of said first and second boundaries in the direction of propagation of said electromagnetic radiation.

39. Apparatus according to claim 21 further including means for fixing the position of said first and second boundaries in a direction transverse to the direction of propagation of said electromagnetic radiation.

* * * * *